United States Patent [19]

Truong

[11] Patent Number: 5,537,655
[45] Date of Patent: Jul. 16, 1996

[54] SYNCHRONIZED FAULT TOLERANT RESET

[75] Inventor: Tuong K. Truong, Renton, Wash.

[73] Assignee: The Boeing Company, Seattle, Wash.

[21] Appl. No.: 342,763

[22] Filed: Nov. 21, 1994

Related U.S. Application Data

[63] Continuation-in-part of Ser. No. 953,537, Sep. 28, 1992, abandoned.

[51] Int. Cl.$^6$ ................................................ G06F 11/00
[52] U.S. Cl. ................ 395/182.1; 307/409; 371/47.1; 375/356; 375/357; 364/950.1; 364/950.3
[58] Field of Search .................................. 395/515, 200, 395/325, 550, 182.1, 182.21; 307/409, 407; 371/3, 5.4, 42, 47.1, 61, 62, 68.1, 68.3; 375/106, 107, 108; 364/950, 950.1, 950.3

[56] References Cited

U.S. PATENT DOCUMENTS

| | | | |
|---|---|---|---|
| 4,575,644 | 3/1986 | Leslie | 307/291 |
| 4,851,710 | 7/1989 | Grivna | 307/269 |
| 4,932,040 | 6/1990 | Barlow | 375/111 |
| 4,973,860 | 11/1990 | Ludwig | 307/269 |
| 4,980,577 | 12/1990 | Baxter | 307/272.1 |
| 5,233,615 | 8/1993 | Goetz | 371/36 |
| 5,276,823 | 1/1994 | Cutts, Jr. et al. | 371/36 |
| 5,295,257 | 3/1994 | Berkovich et al. | 395/550 |
| 5,339,404 | 8/1994 | Vandling, III | 395/575 |
| 5,392,422 | 2/1995 | Hoel et al. | 395/550 |
| 5,404,363 | 4/1995 | Krause et al. | 371/61 |

*Primary Examiner*—Robert W. Beausoliel, Jr.
*Assistant Examiner*—Dieu-Minh Le
*Attorney, Agent, or Firm*—Dellett and Walters

[57] ABSTRACT

A synchronizing circuit comprises a plurality of substantially identical modules for receiving respective asynchronous input signals and respective local clock signals with the local clock signals of the respective modules being substantially synchronized. Each module of the synchronizing circuit comprises a de-metastabilizer stage, a global synchronizing stage and a majority edge detector and voter network. The de-metastabilizer stage receives the input signal of the module and provides an output signal free of glitches and metastable conditions, synchronized to the local clock signal. The global synchronizing stage receives the output signals of the de-metastabilizer stage of each module and provides respective output signals synchronized to the local clock signal. The majority edge detector and voter network receives the output signals of the global synchronizing stage and outputs a voted output signal synchronized to the other modules' voted output signals and to the local clock signal.

12 Claims, 14 Drawing Sheets

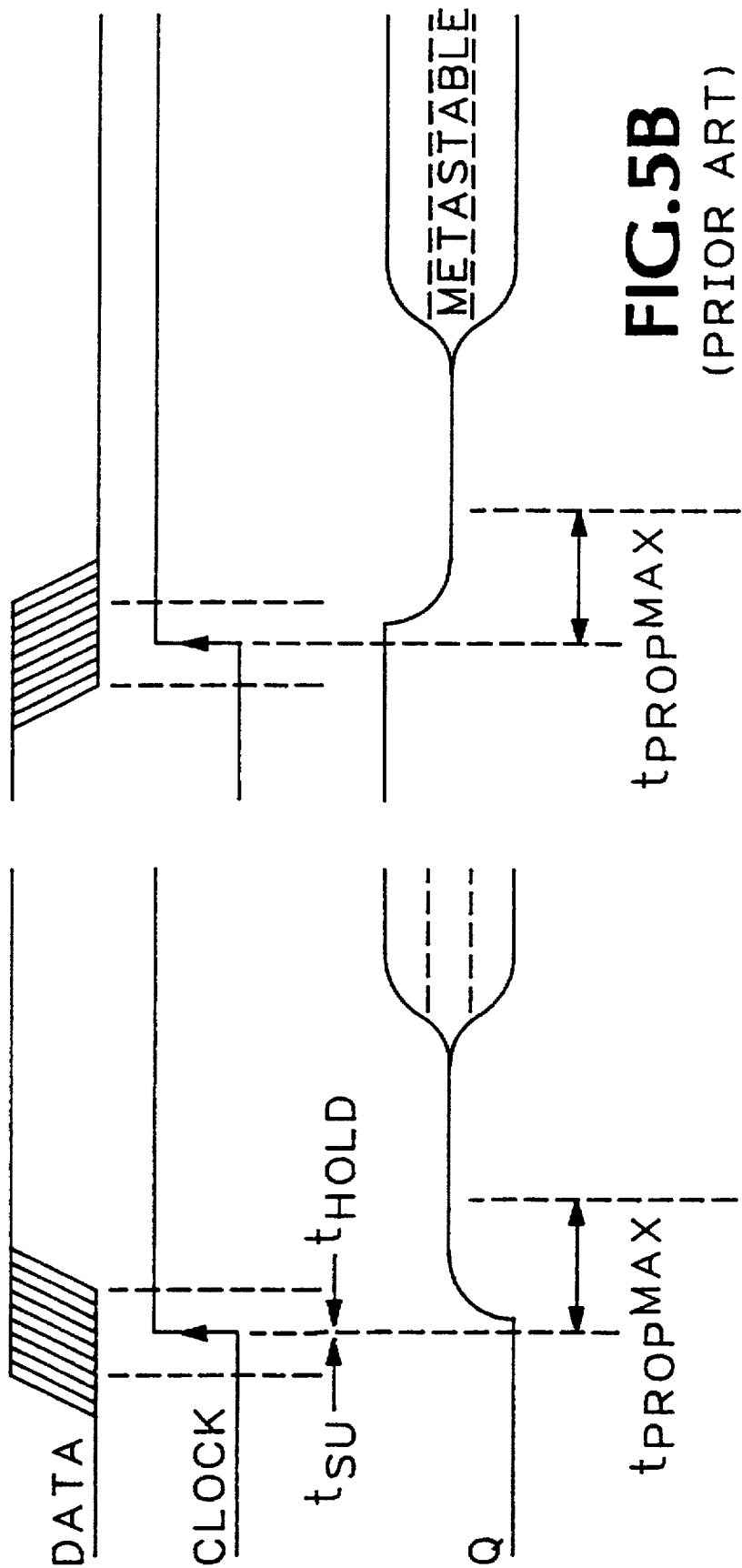

SYNCHRONIZED FAULT TOLERANT RESET

This is a continuation-in-part of application Ser. No. 07/953,537 filed on Sep. 28, 1992, abandoned.

BACKGROUND OF THE INVENTION

This invention relates to a method and apparatus for producing a synchronized fault tolerant output from asynchronous inputs and in particular to a synchronized fault tolerant reset requiring only three modules. The reset outputs are not only fault tolerant and synchronized to each other, but also to the system clock.

Some systems improve reliability by using redundancy. Replication of elements in a parallel fashion may assure that a particular task is carried through to completion even though one of the replicated parallel elements becomes impaired. Such a redundant system is tolerant of faults.

In a fault tolerant computer system employing redundant microprocessor modules, it is desirable that the microprocessors perform their operations in synchronization with respect to the other parallel microprocessors. Such lockstep operation is achieved by providing the processors within the redundant system with local clocks derived from a tightly synchronized fault tolerant clock source and providing each processor with a fault tolerant reset signal synchronized to the local processor clock. The reset signal could be generated in response to a power-up signal (cold start), a manual reset signal (warm start), or by software command. The local processor clocks may be provided by the tightly synchronized fault tolerant clock disclosed in U.S. Pat. No. 4,984,241 describing a 36 MHz clock having a synchronization between modules measured to be better than (less than) one nanosecond.

FIG. 1 shows a typical reset circuit for a three module redundant processing system. The three modules are designated 2A, 2B and 2C respectively. A majority voter 4 in each module receives asynchronous reset signals from each module's corresponding reset signal source. According to the majority of inputs, the majority voter outputs a majority output signal to a latch 6 which will latch this signal to its output upon receiving a latching transition of the local clock signal. The output of the latch is a voted reset signal synchronized (by the latch) to the local clock for controlling the module's microprocessor 8. The output state of the latch in each of the modules should be the same and the processors should operate in lockstep, plus or minus whatever time offsets may exist between the local clocks of the individual modules.

However, because of time offsets which may exist between the various local clocks, variations in propagation delays between various modules, and asynchronous power supply start ups, metastability and "cycle skipping" may occur. Additional problems may arise due to finite rise times associated with signal transitions and variation in threshold values between different latches.

Cycle skipping describes an undesirable phenomenon with respect to a redundant processing system wherein some of the processors are out of step. This happens when some of the processors begin execution on one clock cycle and others begin on a subsequent clock cycle. As a result, the processors are "out of step" with the first processor one (or more) step(s) ahead of the subsequent processors.

FIG. 2 illustrates cycle skipping when multiple resets under transition are clocked by the same clock edge. The output of the majority voter will indicate a reset when a second reset signal is received at the input of the voter, assuming the reset signal is a low logic level. As shown in FIG. 2, the asynchronous reset signals occur before the transition of the clock, and therefore the output of the latch should correctly indicate a reset signal. But if the propagation delay of the majority voter is large enough, the output of the majority voter will not provide a reset signal to the latch until after the clock transition, whereby an out-of-step output signal occurs.

A small time shift in the transition of the output of the majority voter with respect to a clock transition can impact the responsiveness of corresponding latches. Small differences in propagation delays between the respective modules may cause the latch 6A to receive its majority voter output signal before the latch 6B receives its majority voter output signal. Thus, when a clock capturing transition arrives, latch 6A latches and forwards a reset signal to its microprocessor 8A while latch 6B does not. As a result, cycle skipping occurs and the microprocessors will not operate in lock step.

This problem is further compounded when the various modules have local clocks which are slightly offset in time with respect to one another as shown in FIG. 3. At very high clocking rates, a minor offset becomes quite significant and the requirements for obtaining a fault tolerant reset stringent. Assuming that there is no offset between the transitions of the outputs of the majority voters, if the transitions of the local clock signals of the various modules occur at about the same time as the transition of the majority voter output, cycle skipping may result; with modules having an early local clock edge reporting a non-reset condition and those receiving a late local clock edge capturing and reporting a reset condition. When the modules skip, those processors which fail to receive a reset condition begin executing out of step on a subsequent clock edge or may not begin execution at all.

Another problem (illustrated in FIG. 4) may arise when two input transitions are offset in time with respect to one another and a third module produces a malicious failure within this offset time interval. In a simply majority voting structure, multiple voted resets result.

FIG. 5a shows the timing requirements associated with a flip-flop's setup time and hold time and FIG. 5b is a timing diagram illustrating metastability. Whenever a clocked flip-flop synchronizes an asynchronous (unpredictable timing) input signal, there is a probability for metastability to occur. This happens when the input transition violates the setup and hold-time specification and the transition occurs within the time window where the flip-flop decides on the input signal. Metastability can manifest itself in two ways: the flip-flop can go into a non-binary state, higher than logic 0 level but lower than logic 1 level; or the flip-flop can temporarily oscillate, and come out of oscillation when the circuit noise pushes it to either logic level. The metastable time duration is unpredictable but usually bounded.

It is therefore desirable to produce fault tolerant synchronous reset signals from asynchronous reset inputs; in a manner capable of accommodating slight timing offsets between local clocks, forgiving of variations in propagation delays, tolerant of latch threshold variations, immune to metastability problems, and capable of dealing with malicious failures.

In general, the prior art addresses synchronous voted reset signals for systems having slower clock frequencies, for example 10 MHz, providing for large time offsets of several nanoseconds and does not address the problems of metastability and cycle skipping associated with the need to synchronize the reset signals with a system clock. In addition, the prior art is not rigorously fault tolerant and is generally incapable of accommodating a single point failure and can only tolerate simple failures such as stuck at "0" or stuck at "1".

U.S. Pat. No. 4,644,498 discloses a fault tolerant real time clock for a triple modular redundant computer system. The 5 MHz clock comprises three identical channels having separate power supplies, each channel including a majority voted master clock, a counter for producing real time clock pulses, and a power-up time out circuit. The time out circuit is a three input NOR gate that receives three power-up signals from the individual channels. When all the channels are powered up and stabilized, the master clock is gated to the counter and the reset clock output circuit. A reset signal is maintained at the processor for four clock pulses thereby allowing processor startup and countdown to begin in unison for the channels. However, the reset signals in this design are not fault tolerant. For example, due to the NOR gate 34, all three reset channels will be stuck if the power up time-out of any channel is stuck at high. Metastability and cycle skipping can also occur at flip-flop 38 due to asynchronous reset inputs and clock edges.

In Soviet Union Inventor's Certificate No. 378830, a redundant computing system provides a reliable synchronization between channels having random inputs. The design however, does not solve the metastability and cycle skipping that can occur at the latch. In addition, a short at the input of the voter would also fail all three modules.

U.S. Pat. No. 5,117,442 discloses a synchronizing circuit for multiple reset input signals. The circuit consists of three slices and each comprises an initial synchronizer (first stage flip-flop), a local synchronizer (second stage flip-flop), a comparison circuit (majority voter) and a final synchronizer (third stage flip-flop). This design only works for nominally synchronized reset inputs and can only tolerate a benign fault such as an input arriving late, arriving early, being stuck at zero or being stuck at one. This circuit cannot tolerate a random faulty input while the other two inputs are truly asynchronous (i.e., their transitions or displacement window are many clock cycles apart) as shown in FIG. 4 herein. In this case, all voters' outputs will exhibit the faulty behavior of the random input because the voter is a simple majority level-voting circuit that performs asynchronous logical operation. Although synchronized to the clock edge by the final stage flip-flop, multiple voted resets will occur as a result. This behavior is evident in all of the illustrated output waveforms of the voters which show glitches between the small displacement window of the two "good" input signals. These glitches will be amplified to become lengthy random faulty behavior for a larger displacement window between the two good inputs for truly asynchronous inputs. Even if masked or self-checking logic such as dual-rail logic is used in place of the illustrated logic elements, the design still cannot tolerate a random faulty input while the other two inputs are truly asynchronous. Dual-rail logic only adds an identical logic element for comparison without altering its intended function. In addition, this circuit cannot guarantee against metastability due to the asynchronous nature of the reset input with respect to the clock edge. The first stage flip-flop can go metastable and the second stage flip-flops only depend on the probability that the metastability will subside when it reaches the second stage. If it does not subside within half a clock cycle, the second stage flip-flops will go metastable and the rest of the circuit will exhibit faulty behaviors.

SUMMARY OF THE INVENTION

According to the present invention there is provided a synchronizing circuit comprising a plurality of substantially identical modules. Each module receives a local clock signal and an input signal which will likely be asynchronous with respect to the input signals of the other modules. The local clock signals of the respective modules are substantially synchronized. Each module comprises a de-metastabilizer stage for receiving the input signal of the module and providing an output signal free of glitches and metastable condition, synchronized to the local clock signal, and a global synchronizing means for receiving the output signals of the de-metastabilizer of each module and providing respective output signals synchronized to the local clock signal. Each module further comprises a majority edge detector and voter network which receives the output signals of the global synchronizing means and outputs a voted output signal.

According to a second aspect of the present invention, a fault tolerant computer system comprises a plurality of substantially identical modules. Each module receives an asynchronous reset signal and a local clock signal, and the clock signals between modules are substantially synchronized. Each module comprises a de-metastabilizer stage synchronizing the reset signal to the local clock signal, a global synchronizing means receiving the synchronized reset signal from the de-metastabilizer of each module and synchronizing the reset signals to the local clock signal. Each module further comprises a majority edge detector and voter network which receives the synchronized reset signals and outputs a voted reset signal, a third synchronizing means for arming and disarming the majority edge detector and for synchronizing the voted reset signal to the local clock signal, and a computer which receives as inputs the local clock signal and the output signal of the third synchronizing means.

The de-metastabilizer provides a steady state input to the global synchronizing means, which provides synchronous and congruent inputs to the majority edge detector and voter. By employing the de-metastabilizer and the global synchronizing means in combination, metastability and cycle skipping are prevented. By broadcasting the output of the de-metastabilizer in one channel to the inputs of the global synchronizing means in all channels through a buffer network, channel isolation is achieved. The majority edge detector and voter network comprises two majority voting lanes, one lane to detect and vote on the rising edges of the reset signals and the other lane to detect and vote on the falling edges of the reset signals. By employing two voting lanes in combination, a malicious fault as described with reference to FIG. 4 is effectively masked. Lockstep operation of the redundant processors is therefore achieved.

Accordingly, it is an object of the present invention to provide synchronized output signals from asynchronous input signals.

It is another object of the present invention to provide a tightly synchronized fault tolerant reset circuit.

It is another object of the present invention to provide a tightly synchronized fault tolerant reset circuit overcoming the problems of metastability and cycle skipping.

It is a further object of the present invention to provide a tightly synchronized reset circuit wherein a failure in an individual module such as faults associated with pins of an integrated circuit within the module will be confined to that module.

BRIEF DESCRIPTION OF THE DRAWINGS

For a better understanding of the invention, and to show how the same may be carried into effect, reference will now be made, by way of example, to the accompanying drawings in which:

FIG. 5b is a timing diagram illustrating metastability associated with a bistable device;

DETAILED DESCRIPTION

Figure 6A:
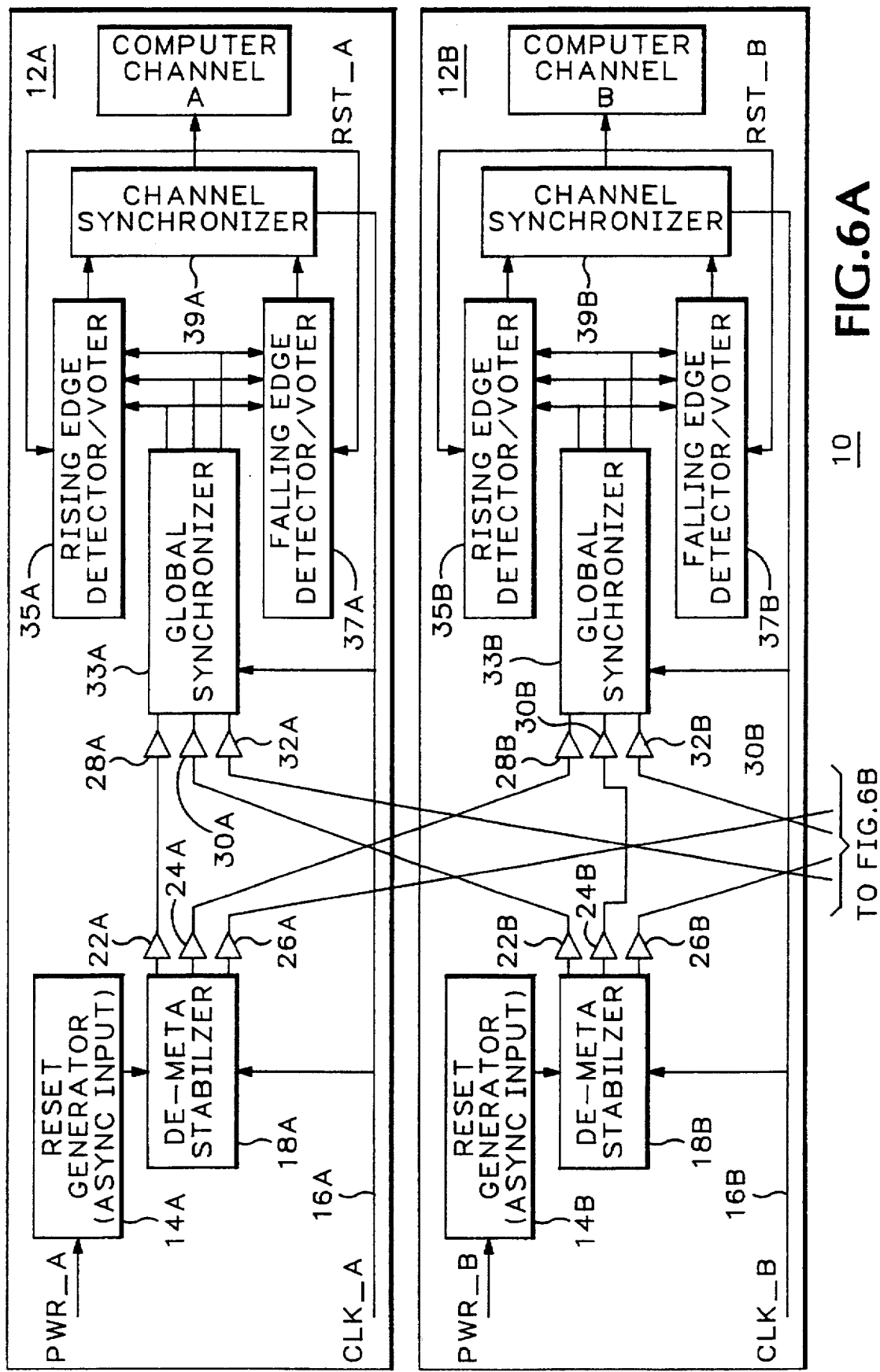
FIG. 6A and 6B comprise a functional block diagram of a tightly synchronized fault tolerant reset embodying the present invention.
Figure 6B:
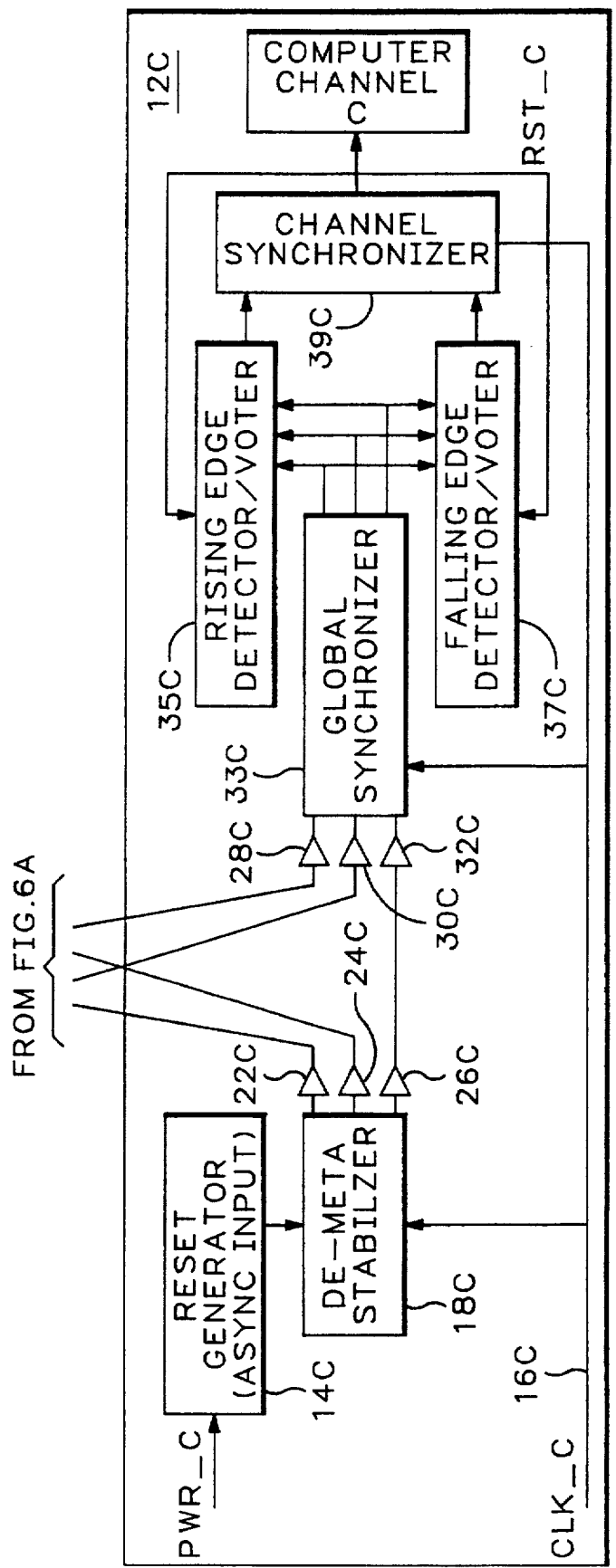

FIGS. 6A and 6B comprise a functional block diagram of a tightly synchronized fault tolerant computer system including a reset circuit embodying the invention. The tightly synchronized fault tolerant reset circuit 10 has three substantially identical modules 12A, 12B and 12C, each module 12 receiving a local clock signal, a local reset signal, and asynchronous reset signals from the other modules and comprising mechanisms for synchronizing and de-metastabilizing the local reset signal to the local clock signal, establishing synchronization of the reset signals from the other modules to the local clock, detecting the transitions of edges and providing a majority voted reset, and synchronizing the majority voted reset to the local clock. The synchronized, majority voted reset of each module is applied to the computer of that module.

Referring to a particular module 12A, a reset generator 14A receives an input PWR_A and provides output to de-metastabilizer block 18A. The de-metastabilizer supplies output to global synchronizer 33A of the local module via inverters 22A and 28A, as well as to the respective global synchronizers 33B and 33C of other modules 12B and 12C, via inverters 24A, 28B and 26A, 28C. Global synchronizer 33A receives input from the de-metastabilizers 18B and 18C of the other modules 12B and 12C via inverters 30A and 32A respectively. Three output signals from global synchronizer 33A are provided to each of rising edge detector/voter block 35A and falling edge detector/voter block 37A and output lines from each of blocks 35A and 37A are coupled to channel synchronizer 39A, wherein the output thereof, designated RST_A, a highly synchronized voted output, is coupled back as input to edge detector/voter blocks 35A and 37A as well as to computer channel A, for example. De-metastabilizer block 18A, global synchronizer block 33A and channel synchronizer block 39A receive clocking information from local clock CLK_A 16A. Modules 12B and 12C are similar to module 12A.

Figure 1:
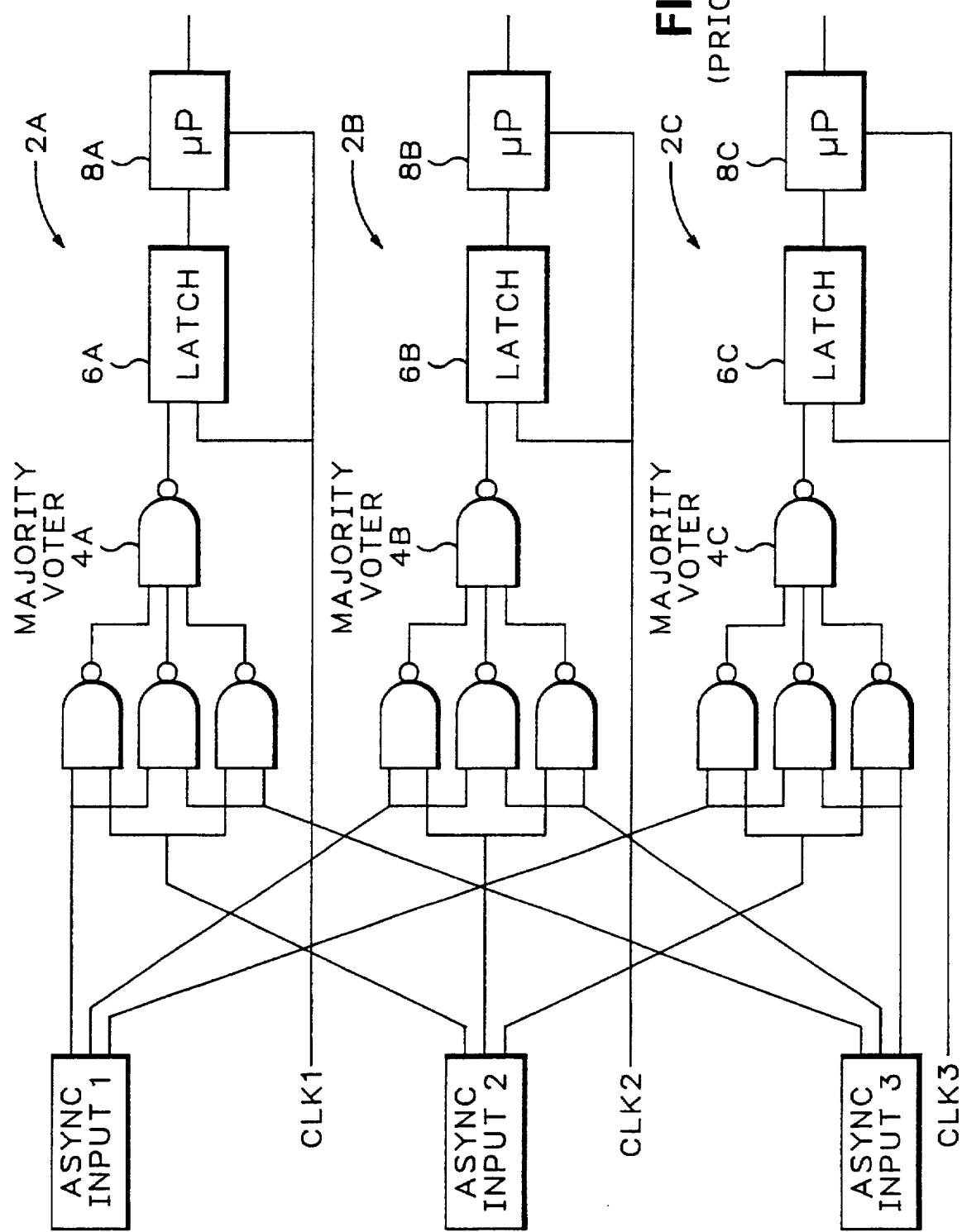
FIG. 1 is a schematic drawing of a prior art reset circuit.
Figure 2:
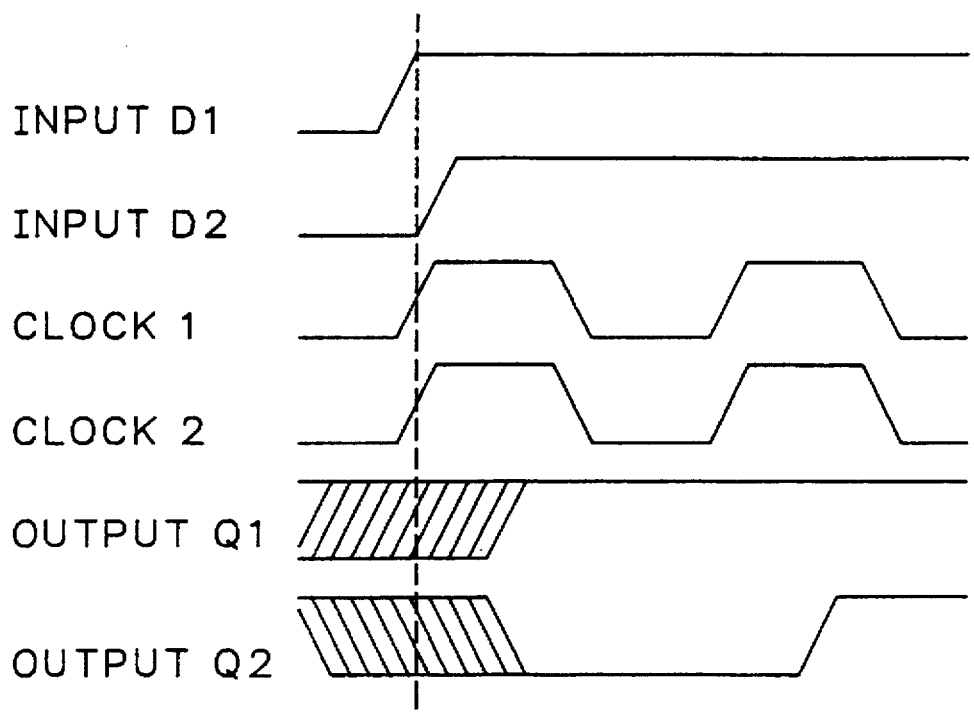
FIG. 2 is a timing diagram showing cycle skipping as a result of variations in propagation delay.
Figure 3:
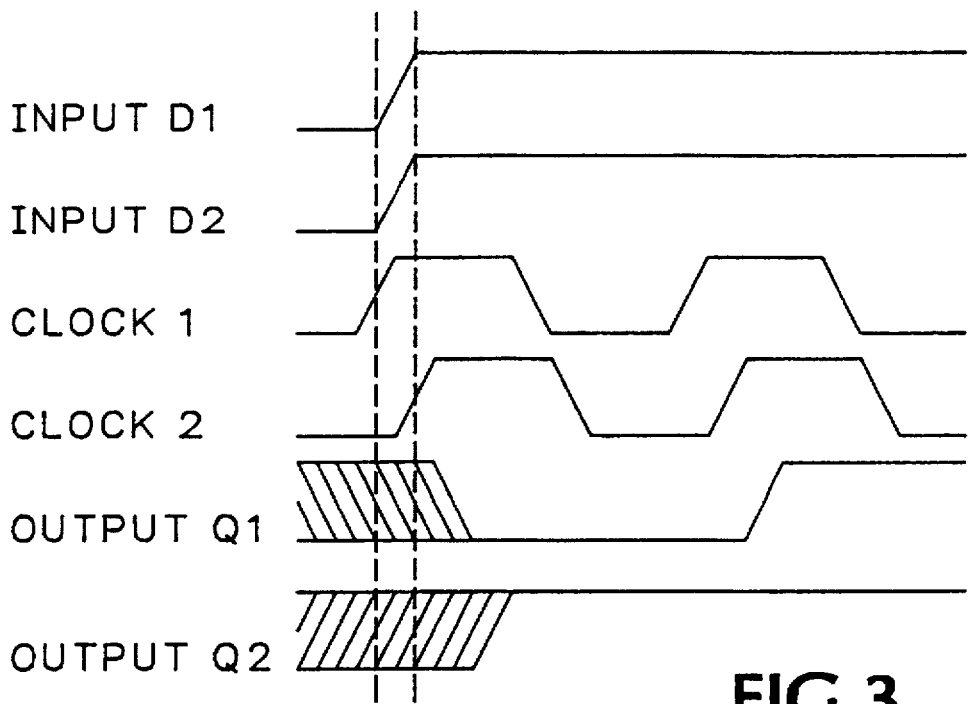
FIG. 3 is a timing diagram showing cycle skipping resulting from variations in local clocks.
Figure 4:
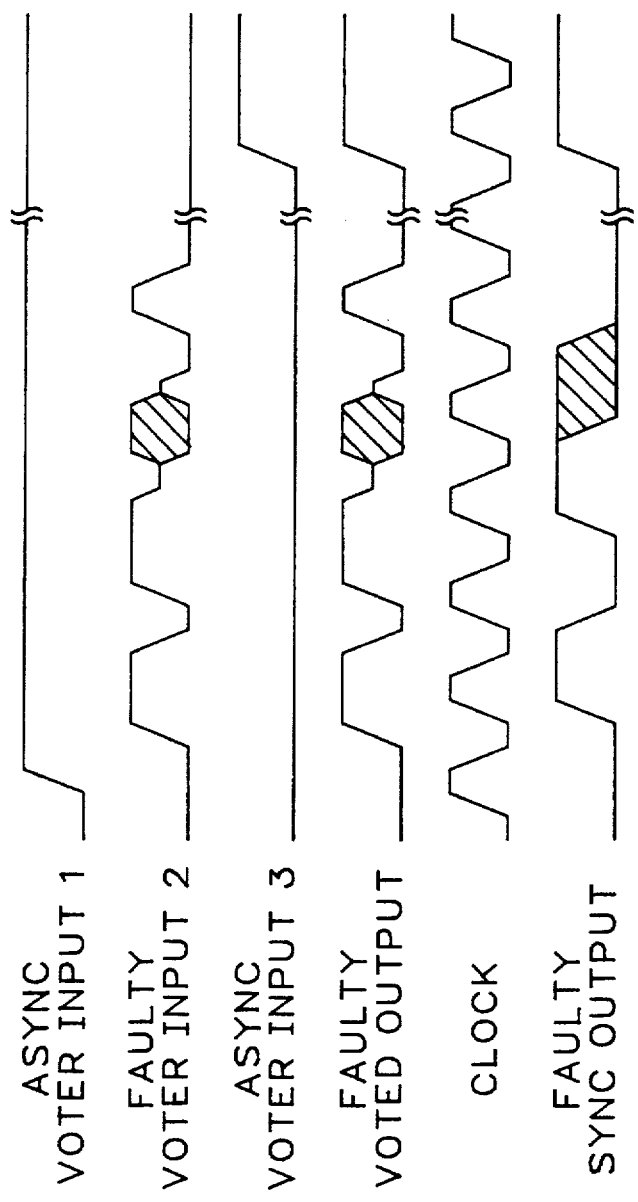
FIG. 4 is a timing diagram showing operation of a majority voter with a malicious failure.
Figure 7:
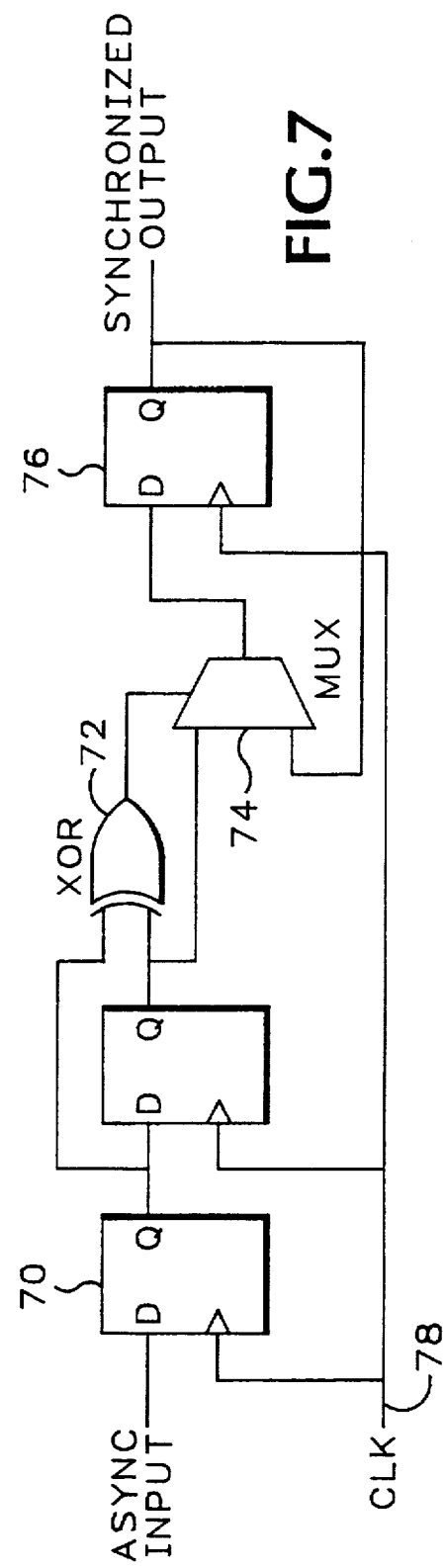
FIG. 7 illustrates the de-metastabilizer.
Figure 5A:
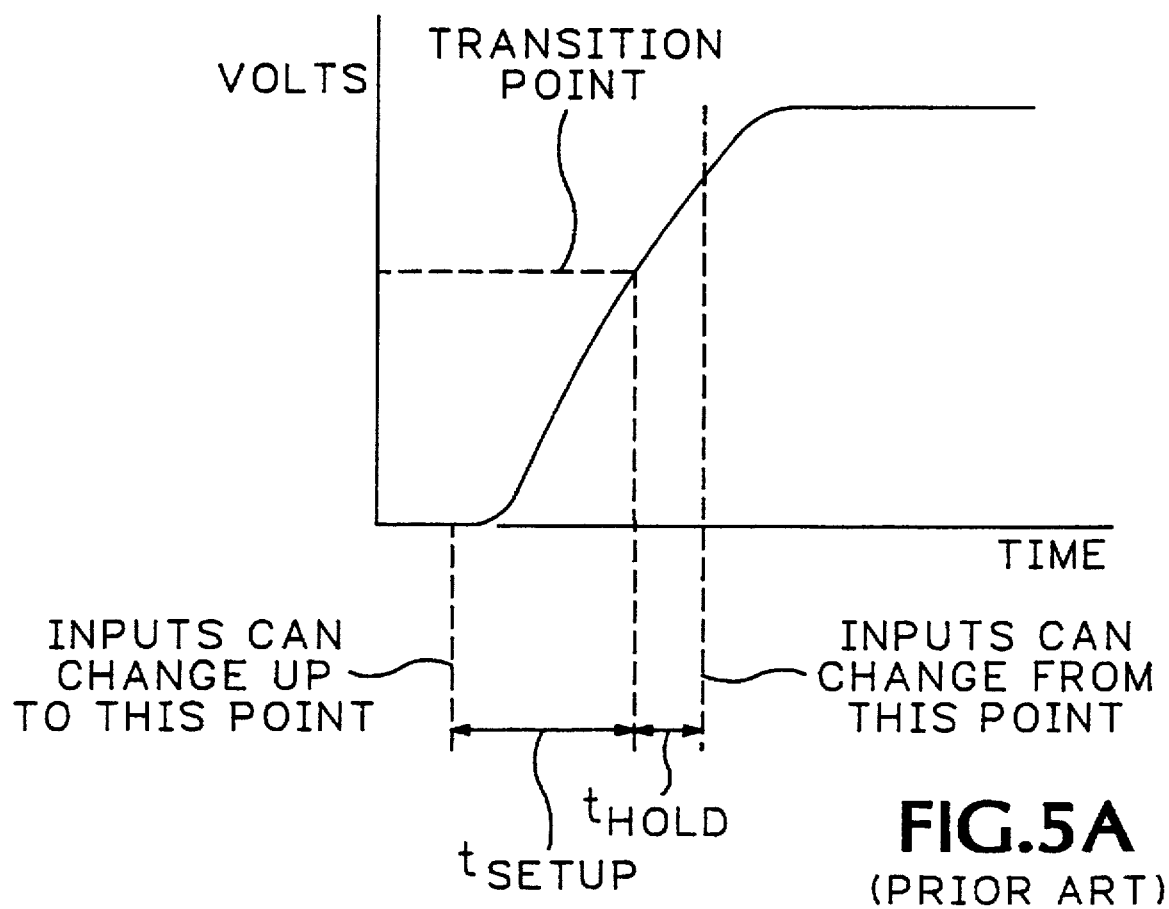
FIG. 5a shows the timing parameters of a positive-edge-triggered D-flip-flop.
Figure 8A:
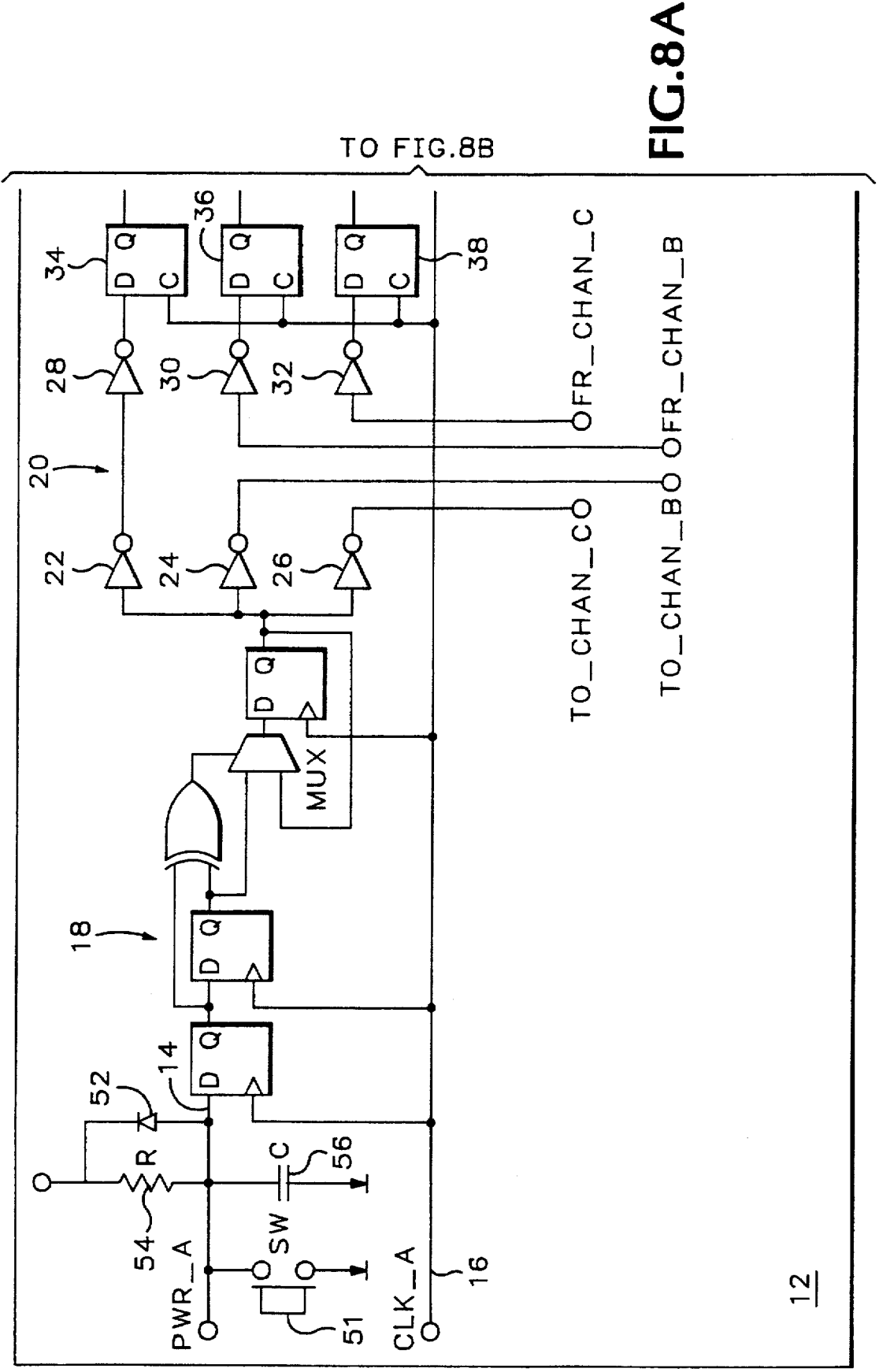
FIG. 8A and 8B show a schematic diagram for one module of the present invention.
Figure 8B:
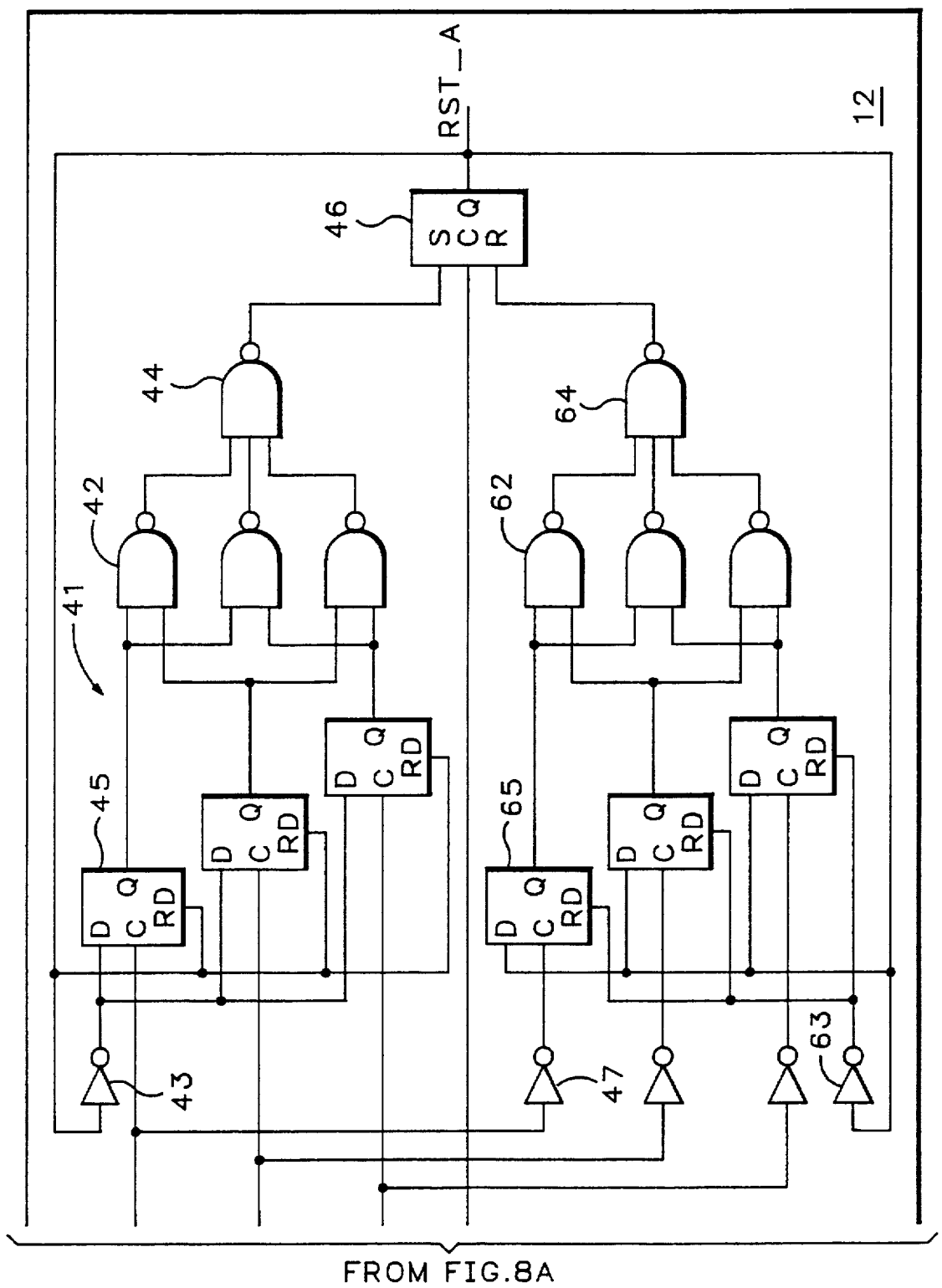

The block diagram shown in FIGS. 6A and 6B is further illustrated in FIGS. 7, 8A and 8B with FIG. 7 being the de-metastabilizer schematic and FIGS. 8A and 8B being a schematic representation of one module.

If the intended application for the fault tolerant computer is not critical, the de-metastabilizer can be replaced by a synchronizer comprising a D-type flip-flop that triggers on the rising edge of the local clock. Since the probability of the first stage flip-flop to come out of metastability is not guaranteed, it is preferred to employ a de-metastabilizer as illustrated in FIG. 7. The de-metastabilizer also serves as input de-glitcher and consists of three D-type flip-flops that trigger on the rising edges of the channel clock. A first flip-flop 70 receives an asynchronous input (Async Input) to the D input and the output of first flip-flop is coupled to one leg of an exclusive-OR gate 72 (XOR) as well as to the data input of second flip-flop 74. The XOR gate's second input is supplied by the output of the second flip-flop, which also comprises an input to a 2 to 1 multiplexer 74 (Mux). The multiplexer output provides the data input to a third flip-flop 76 and the output thereof is the second input to the multiplexer. The third flip-flop output is also the synchronized output. Each of the flip-flops 70, 74 and 76 receive clocking via clock signal 78 (CLK). Since the XOR gate is coupled to the outputs of the first two flip-flops, it detects the changes in the input signal. The output of the XOR gate serves as the control select for the multiplexer. If the input doesn't change, the XOR output is at logic "0" and the multiplexer will route the input through. If the input changes due to glitches or metastability, the XOR gate output is at logic "1" and the multiplexer feeds back the existing signal and holds the output unchanged. Therefore, the input must be stable for at least one clock cycle for the output to accept and transmit it.

As shown in FIGS. 8A and 8B, each module 12 receives a local clock 16 and an asynchronous reset input 14. The local clock is provided by one channel of a tightly synchronized fault tolerant clock source. The reset signal and clock are input to the de-metastabilizer. An isolation buffer 20 comprising eighteen inverting gates is connected between the outputs of the de-metastabilizer 18 and the latches 34, 36 and 38. Latches 34, 36 and 38 establish synchronization of the reset signals to the local clock and comprise the global synchronizer 33 of FIGS. 6A and 6B. The inverting gates are arranged with three gates 22, 24 and 26 connected directly to the output of de-metastabilizer 18. Referring still to FIGS. 8A and 8B, the outputs of these three gates are connected to three more inverting gates 28, 30 and 32, one in each module. The gates 28, 30 and 32 in each module are directly connected to the inputs of latches 34, 36 and 38 respectively in that module. The latches 34, 36 and 38 in each module also receive the module's local clock signal as clocking input.

The outputs of latches 34, 36 and 38 are sent to a majority edge detector and voter network 41. Referring further to FIGS. 8A and 8B, the majority edge detector and voter network comprises two voting lanes, rising edge detector/voter 35 (FIGS. 6A and 6B) and falling edge detector/voter 37 (FIGS. 6A and 6B), each of which receives the outputs of the second synchronizing latches 34, 36 and 38. The first lane comprises an inverting gate 43, three D-type flip-flops 45, three two-input NAND gates 42 and a three-input NAND gate 44. The NAND gates 42 are arranged to receive the respective combinations of the outputs from the three flip-flops. The outputs of the NAND gates 42 form the inputs to the three input NAND gate 44. The configuration of the above mentioned components is as follows: The outputs of flip-flops 34, 36 and 38 are supplied as the clock inputs to the three D-flip-flops 45. The output of the first flip-flop becomes inputs for first and second two-input NAND gates 42, while the output of the second flip-flop 45 generates the second input of the first NAND 42 and an input to a third NAND 42. The third flip-flop 45 supplies the second inputs to the second and third NAND gates 42. Three input NAND 44 employs the three outputs of the NAND gates 42 as input and the output of NAND 44 provides the set input to SR flip-flop 46. The output of SR flip-flop 46 is coupled to the reset input of each of flip-flops 45 and, as inverted by inverter 43, to the data input to each of flip-flops 45.

The input signals to the second lane are inverted by three inverting gates 47 and the inverted outputs are supplied to the clock inputs of three D-flip-flops 65. The output of the first flip-flop 65 comprises inputs for first and second two-input NAND gates 62, while the output of the second flip-flop 65 comprises the second input of the first NAND 62 and an input to a third NAND 62. The third flip-flop 65 provides the second inputs to the second and third NAND gates 62. Three input NAND 64 receives the three outputs of NAND gates 62 and the output of NAND 64 comprises the reset input to SR flip-flop 46. The output of SR flip-flop 46 comprises the D input to each of flip-flops 65 and, when inverted by inverter 63, the reset input to each of flip-flops 65. Accordingly, whereas the first lane votes on the rising edges of the reset signals, the second lane votes on the falling edges of the reset signals.

In order for a system voted reset to occur, the first reset must remain at the voter input until arrival of a second reset. Upon arrival of the second reset signal, one lane of the majority voter will output a voted reset signal.

The output of the majority voter is input along with the local clock signal to a set-reset flip-flop 46 which comprises the channel synchronizer 39 of FIGS. 6A and 6B. When flip-flop 46 is low, the D-flip-flops of the first voting lane receive this low signal at reset inputs (RD) from flip-flop 46 and receive a high signal at their D inputs via inverter 43. In this state, the first voting lane flip-flops 45 are "armed" and each waiting to receive a rising edge at its clock input from the respective latch 34, 36 and 38, whereupon it clocks the high signal at the D input and produces a high output to be received by respective NAND gates 42. If two of the armed flip-flops 45 receive enabling reset transitions (from flip-flops 34, 36 or 38) then a majority reset condition arises whereby the NAND gate 44 will output a high signal as a voted reset to be received at the "S" input of the SR flip-flop 46. At the local clock's next rising edge, the SR flip-flop latches a high state and produces a high synchronized voted reset output. This signal is sent to a computer that also receives the local clock. In this manner, the computers of the three modules are guaranteed to start in lockstep.

When SR flip-flop 46 produces the high output, the first lane flip-flops 45 receive high levels at the RD (reset) inputs and low levels at the D inputs via the inverter 43. Flip-flops 65 of the second lane become armed with low levels at the RD inputs via inverter 63 and high levels at their D inputs. With these voltage levels, flip-flops 45 are reset (producing low levels at their outputs independent of the local clock) and each flip-flop 65 is armed, waiting to latch and send a high signal to the respective second lane NAND gate 62 upon receiving a disabling transition at the flip-flop's clock input. A disabling transition will occur when the reset input 14 is cleared and the outputs of at least two of flip-flops 34, 36 and 38 return to low states. Once two of the three synchronizing latches (34, 36 or 38) transition from high to low, whereupon two of the inverters 47 have produced corresponding positive going transitions, and two of the flip-flops 65 have received the disabling transitions, the second lane NAND gate 64 will recognize that a majority of disabling transitions have been received and will send a high signal to the R input of SR flip-flop 46. The SR flip-flop will reset its Q output upon receiving the next low-to-high local clock transition. A low signal output from SR flip-flop 46 will reset flip-flops 65 to low levels and the flip-flops 45 will again be armed to repeat another voted reset cycle. Thus, the two lane majority edge detector and voter network and the SR flip-flop 46 produce a high synchronized voted output (synchronized to the local clock) upon receiving a majority of enabling input transitions and produce a low output synchronized to the local clock upon receiving a majority of disabling transitions subsequent to the production of the high synchronized voted output.

The fault tolerance provided by the redundant architecture and majority voter is enhanced by the buffers 20. The buffers provide an effective scheme for isolating multiple pin errors that may occur at the inputs of the second stage latches where the signals are exchanged between modules. In this manner, a failure in any one module will not affect any of the other modules.

Figure 9:
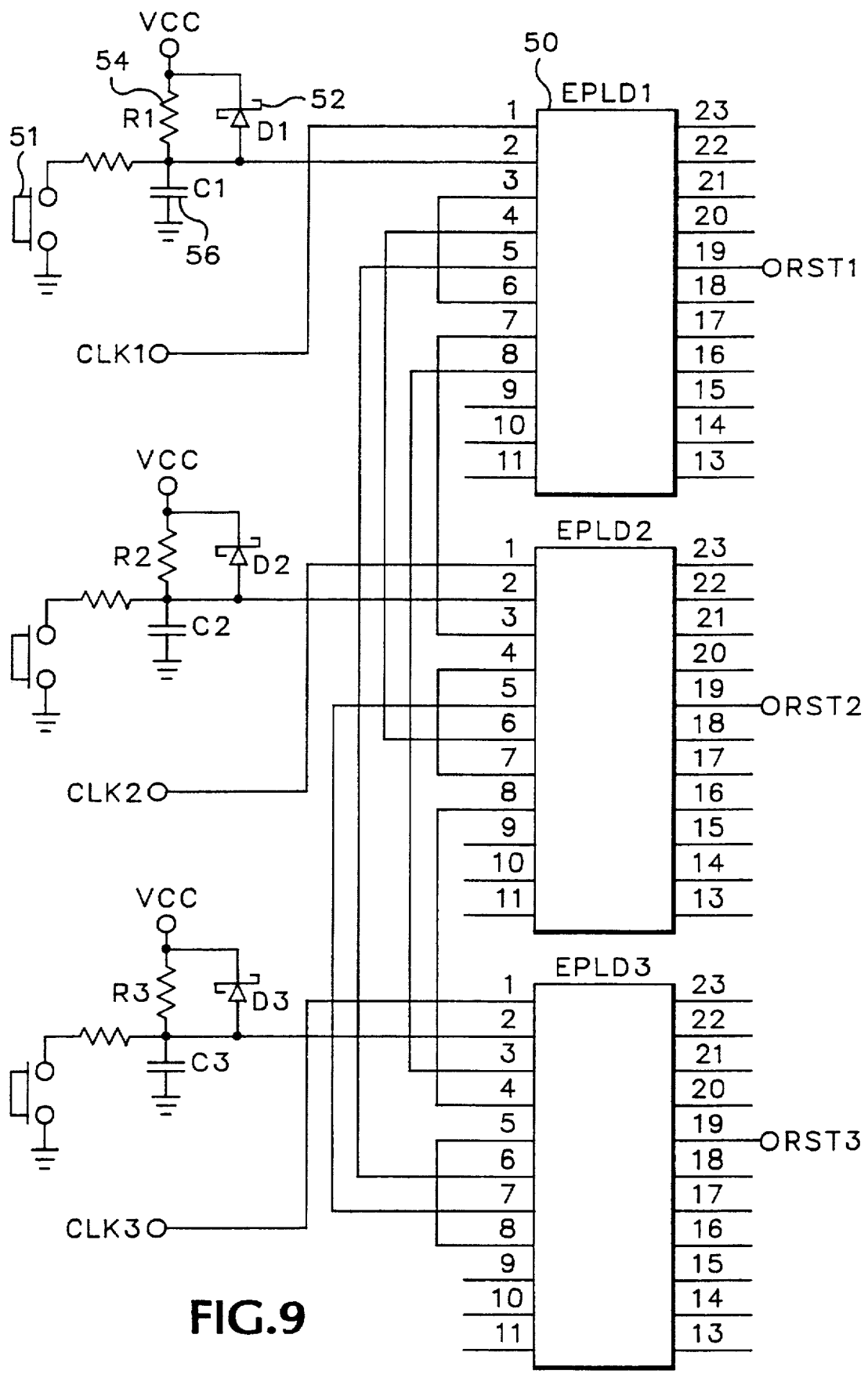
FIG. 9 is a schematic diagram of a PLA implementation of the reset circuit.

FIG. 9 shows a highly reliable implementation of the circuit illustrated in FIGS. 8A and 8B employing programmable logic arrays for minimum parts count. Suitable technology includes Lattice's GAL, Xilinx's FPGA and Altera's EPLD. Each programmable logic array (PLA) 50 receives as inputs the local clock signal and an asynchronous reset signal, and outputs the voted reset signal to the computer (not shown). The logic arrays 50 are suitably connected to implement the logic shown in FIGS. 8A and 8B.

As shown in FIG. 9, the reset signal is generated when a voltage Vcc is applied through the anode of a zener diode 52 and a resistor 54 connected in parallel, with the other end of the resistor being connected through a capacitor 56 to ground and to the input of the logic array 50. Zener diode 52 discharges the capacitor at power down. During power up, the RC delayed rising edge of the voltage across the capacitor 56 acts as the reset signal which is received by the PLA. Therefore, each time the system is turned on, Vcc is energized and each module receives a "cold reset". A "warm" reset is generated when an operator pushes an external reset button while the system is running, thereby momentarily closing a switch 51 and discharging the capacitor through a small resistor. When the switch opens again, the voltage across the capacitor rises and a reset signal is produced.

Even if all three modules in this particular embodiment are turned on simultaneously, the reset signals input to the logic array are most likely asynchronous because of the RC time constant variations created by the different resistors 54 and capacitors 56 of each module. With clock speeds higher than 20 MHz, the variance in RC time constants is sufficient to provide asynchronous reset inputs. Manual operation such as pushing the reset switches 51 will certainly result in totally asynchronous reset inputs.

When one of the modules becomes impaired within the operating redundant system, the remaining functional modules receive a reset signal corresponding to the faulty module. With only one faulty reset and two good resets received by the majority voters of the functional modules, the majority voters still produce a voted reset condition. As such, the redundant system tolerates the faulty module and the respective processors of the functional modules continue operating in lockstep impervious to the faulty module. However, if the fault occurs at or beyond the voting stage of the damaged module, then the other two modules still provide synchronized reset outputs. The damaged module is effectively isolated.

Figure 10:
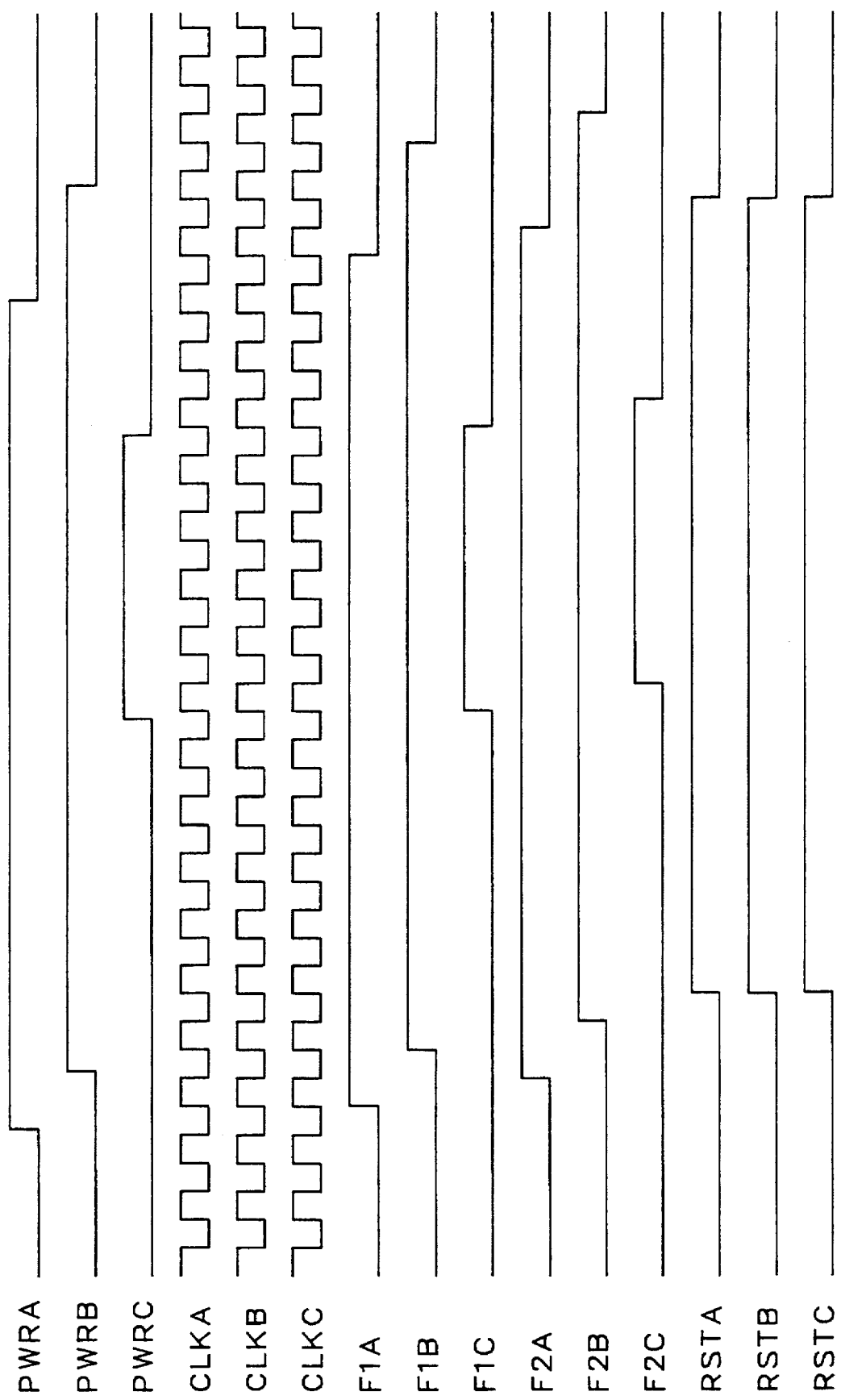
FIG. 10 is a timing diagram for a fault-free reset cycle.
Figure 11:
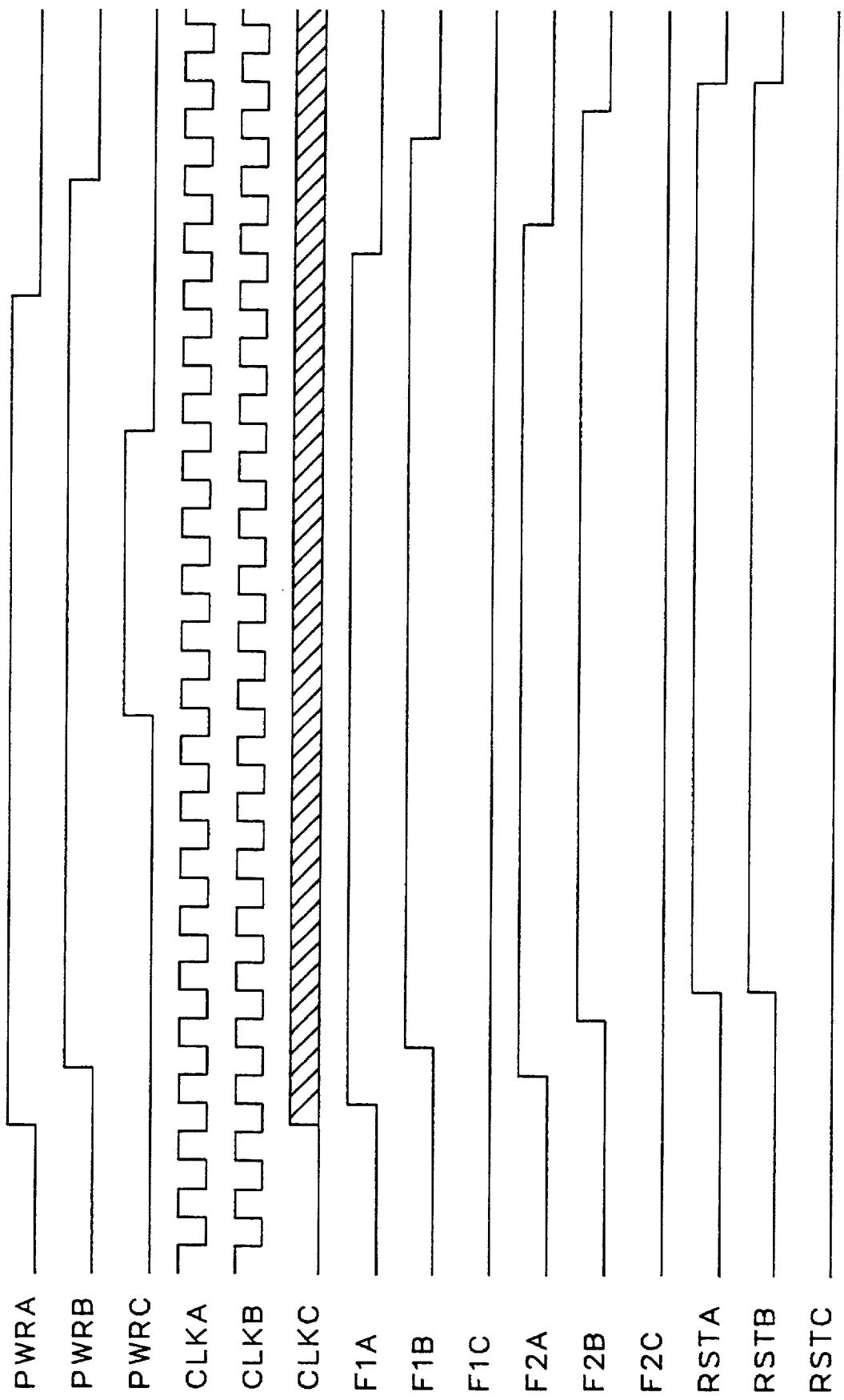
FIG. 11 is a timing diagram for the reset circuit illustrating a faulty clock; a FIG. 12 is a timing diagram for the reset circuit illustrating a reset input which has failed and is stuck in the lower state.
Figure 12:
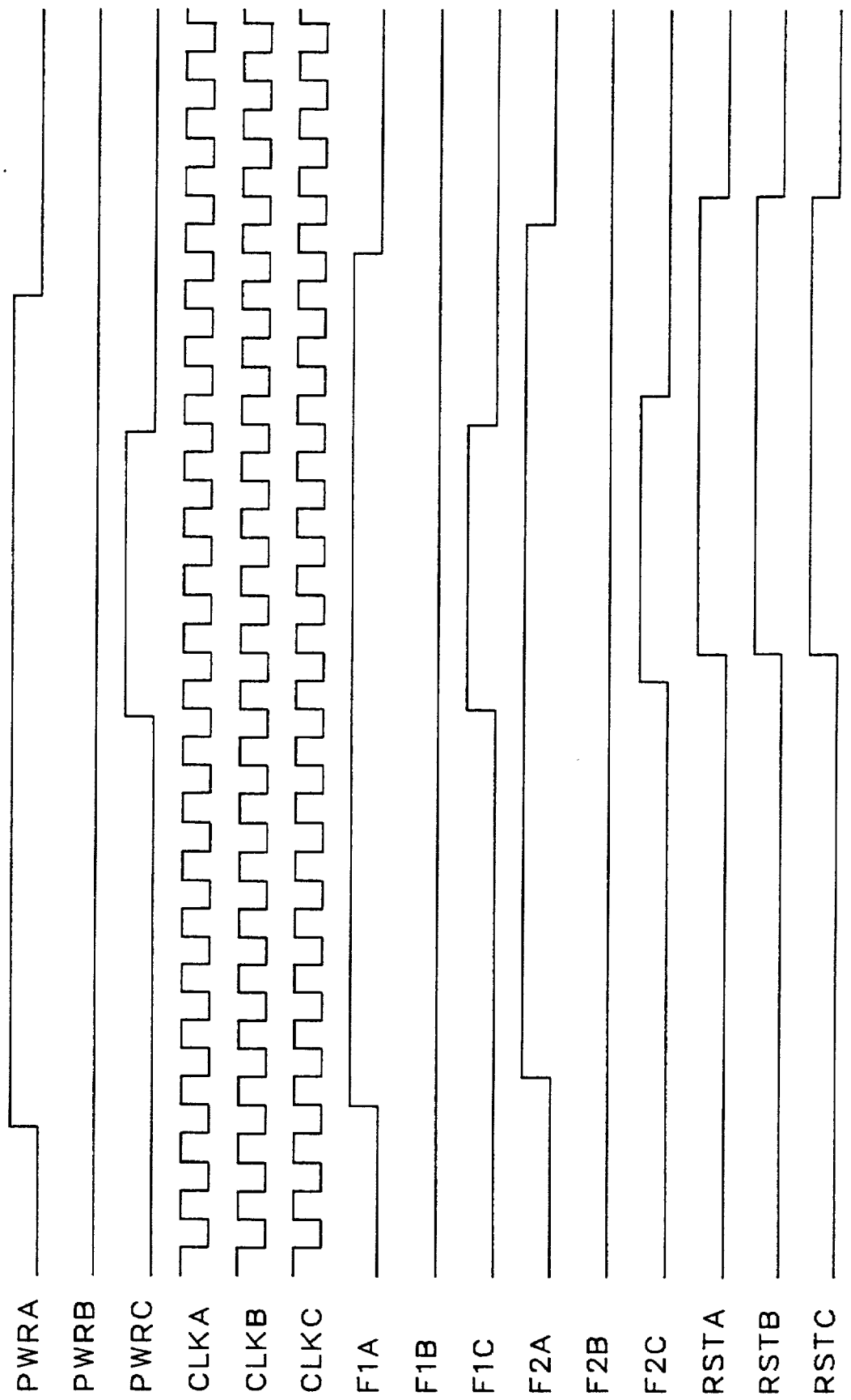
Figure 13:
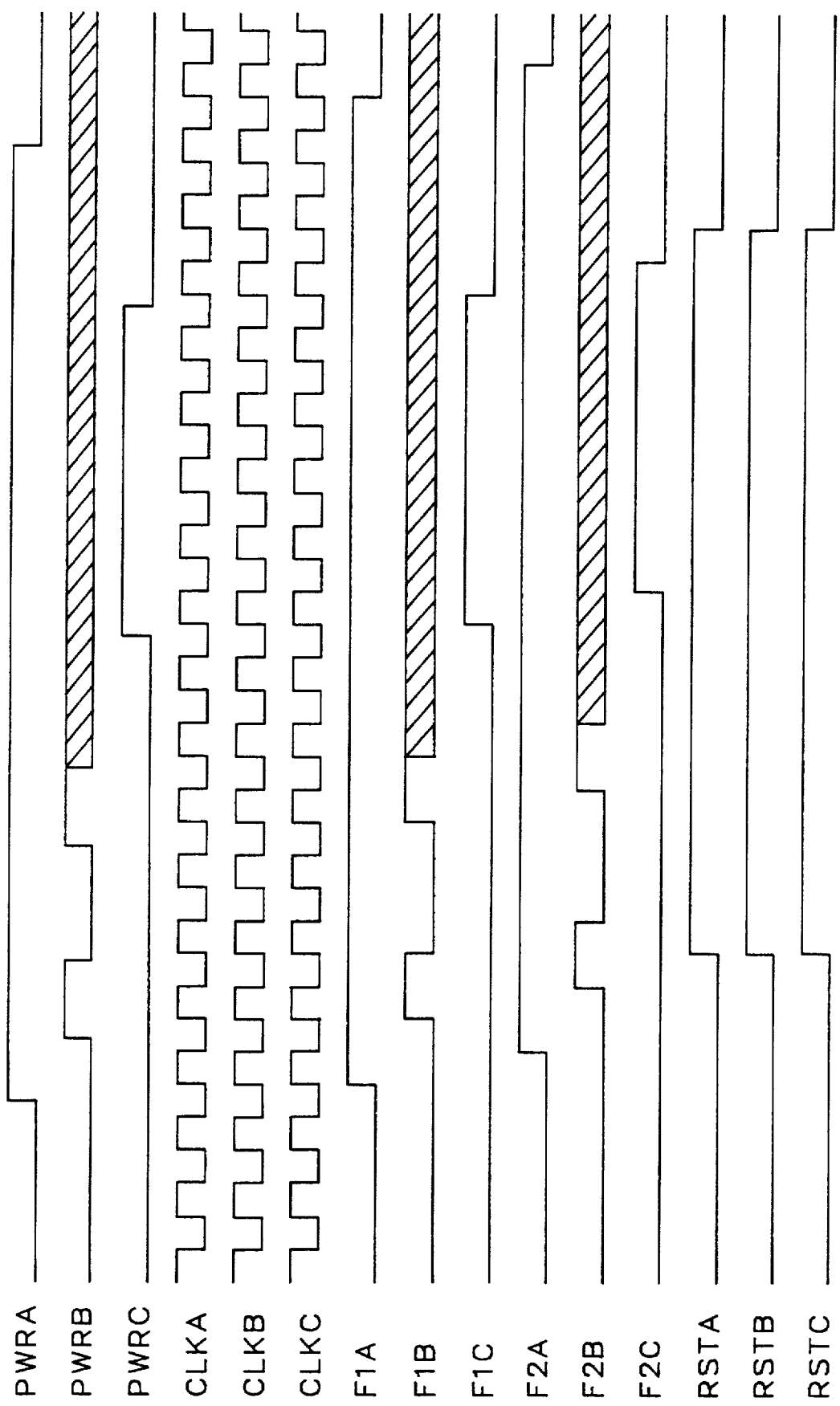
FIG. 13 is a timing diagram for the reset circuit illustrating a malicious fault.

The operation of the tightly synchronized fault reset circuit is described in reference to the timing diagrams shown in FIGS. 10, 11, 12 and 13. In these figures, PWRA, PWRB, and PWRC are the asynchronous reset inputs; CLKA, CLKB and CLKC are the synchronized local clock; F1A, F1B, and F1C are the outputs of the de-metastabilizers 18; F2A, F2B and F2C are the outputs of the global synchronizing means 33, with one set for each module; and RSTA, RSTB and RSTC are the synchronous voted reset outputs. In a fault-free case, FIG. 10 shows that three synchronous reset outputs RSTA, RSTB and RSTC go high upon receiving two positive going transitions from the reset inputs PWRA and PWRB. The synchronous voted reset output transition low when two of the reset inputs transition low (PWRC and PWRA). FIG. 11 shows a system in which one module has a failed local clock, CLKC. Modules A and B continue to operate despite the failed module C. The C module reset input has no effect upon the other two as the clock is not able to latch forward reset signals to the A and B modules. Also, the C module's voting network does not respond to the A and B modules as there is not a clock available for latching the A and B reset signals. FIG. 12 represents a condition where the input PWRB is shorted to ground and fails to come up, staying at ground level (it could just as easily have been shorted to VCC or open circuited). Note, that the system still produces synchronous outputs. In FIG. 13, PWRA transitions high and PWRB subsequently oscillates and finally becomes an open circuit (high impedance state). Even under these circumstances, the system generates the correct synchronous outputs.

The de-metastabilizer stage synchronizes the reset signal to the local clock thereby providing a steady state input to the second stage of latches (34, 36 and 38). The second stage latches (34, 36 and 38) synchronize the reset signals from each module to the local clock in order to provide synchronous and congruent inputs to the majority voter. By employing the de-metastabilizer and the global synchronizer in combination, metastability and cycle skipping are prevented. By broadcasting the output of the de-metastabilizer in one channel to the inputs of the global stage latches in all channels through the buffer network, channel isolation is achieved. The edge voting network comprises two majority edge voting lanes, one lane to detect and vote on the rising edges of the reset signals and the other lane to detect and vote on the falling edges of the reset signals. By employing two voting lanes in combination, a malicious fault of one channel (in the presence of excessive time offset with respect to the positive transition of the reset signals of the other two channels) is effectively masked. Lockstep operation of the redundant processors is therefore achieved.

The described embodiment has three modules but the invention is applicable for three or more modules in a fault tolerant computer system. In addition, it is apparent that this invention is not limited to "reset" signals and could also be employed in association with other asynchronous events such as ready line, DMA request and other external interrupts.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true scope of the invention.

I claim:

1. A synchronizing circuit comprising a plurality of modules for receiving respective asynchronous input signals and respective local clock signals, each module comprising:

a de-metastabilizer stage for receiving the input signal and the local clock signal of said module and providing a first stage output signal representative of the input signal synchronized to the local clock signal, said first stage output signal being free of glitches and metastable conditions, a global synchronizing means for receiving the first stage output signal of the de-metastabilizer stage of each module and the local clock signal of said module and providing respective second stage output signals synchronized to the local clock signal, each second stage output signal being representative of the respective first stage output signal of an associated de-metastabilizer stage as synchronized to the local clock signal of said module, and a majority edge detector and voter network for receiving the second stage output signals of the global synchronizing means of said module and outputting and holding a voted output signal upon receiving from the global synchronizing means of said module a majority of enabling edge transitions of the second stage output signals.

2. A synchronizing circuit according to claim 1 wherein the majority edge detector and voter network outputs and holds as said voted output signal one of a high or low voted output signal upon receiving a majority of enabling edge transitions of the second stage output signals received from the global synchronizing means of said module and subsequently outputs and holds the other of said high or low voted output signal upon receiving a majority of disabling edge transitions of the second stage output signals received from the global synchronizing means of said module.

3. A synchronizing circuit according to claim 1 further comprising an isolation buffer network between said de-metastabilizer stage and said global synchronizing means.

4. A synchronizing circuit according to claim 1 further comprising, for each module, means for generating a reset signal to provide the input signal.

5. A synchronizing circuit according to claim 1 wherein said de-metastabilizer stage is a plurality of latches interconnected by an XOR gate and a multiplexer, and said global synchronizing means is a plurality of latches.

6. A synchronizing circuit according to claim 1 wherein said de-metastabilizer synchronizes the input signal to a rising edge of the local clock signal, and said global synchronizing means synchronizes the first stage output signals of said de-metastabilizer to the rising edge of the local clock signal.

7. A synchronizing circuit according to claim 1 wherein each module further comprises third synchronizing means for arming and disarming the majority edge detector and for synchronizing said voted output signal of the majority voter network to the local clock signal.

8. A synchronizing circuit according to claim 1 wherein the majority edge detector and voter network includes:

first lane latching means for providing a first lane latched output signal for each second stage output signal, each first lane latched output signal being latched in a first state when the corresponding second stage output signal transitions from a first state to a second state, each first lane latched output signal that has been latched into said first state remaining in said first state until cleared by a voted reset output signal; and first lane majority voting means for providing said voted reset output signal synchronous with the local clock signal and in accordance with a majority of the first lane latched output signals of the first lane latching means.

9. A synchronizing circuit according to claim 8 wherein the majority edge detector and voter network further comprises:

second lane latching means for providing a second lane latched output signal for each second stage output signal, each second lane latched output signal being latched in a first state when the corresponding second stage output signal transitions from its second state to its first state when said voted reset output signal is in a first state, each second lane latched output signal that has been latched into said first state remaining in said first state until cleared by the complement of said voted reset signal; and second lane majority voting means for clearing said voted reset output signal to a second state in accordance with a majority of the second lane latched output signals of the second lane latching means.

10. A fault tolerant computer system comprising a plurality of modules for receiving respective asynchronous reset signals and respective local clock signals, each module comprising:

a de-metastabilizer stage for firstly synchronizing the reset signal of said module to the local clock signal, a global synchronizing means for receiving the firstly synchronized reset signal from the de-metastabilizer stage of each of said plurality of modules and secondly synchronizing the firstly synchronized reset signals to the local clock signal, a majority edge detector and voter network having a plurality of input terminals for receiving the secondly synchronized reset signals from the global synchronizing means of said module, and an output terminal for outputting a voted reset signal representative of the majority of the secondly synchronized reset signals, the majority edge detector and voter network providing said voted reset signal which is held in a given state upon receiving a majority of enabling edge transitions of the secondly synchronized reset signals from the global synchronizing means of said module, third synchronizing means for arming and disarming the majority edge detector and for synchronizing the voted reset signal to the local clock signal, and computer means for receiving as inputs the local clock signal and the synchronized voted reset signal.

11. A fault tolerant computer system according to claim 10 wherein the majority edge detector and voter network provides said voted reset signal which is held in one of a high or low state upon receiving a majority of enabling edge transitions of the secondly synchronized reset signals from the global synchronizing means of said module when said voted reset signal is the other of said high or low states and subsequently outputs said voted reset signal which is held in the other of said high or low states upon receiving a majority of disabling edge transitions of the secondly synchronized reset signals from the global synchronizing means of said module when said voted reset signal is the one of said high or low states.

12. A fault tolerant computer system according to claim 10 wherein said third synchronizing means comprises an S/R flip-flop means for providing said synchronized voted reset signal in accordance with the signals received at its S and R inputs as clocked by the local clock; and said majority edge detector and voter network comprises first and second lane latching and voting means supplying respective first and second lane voted output signals to the S and R inputs of said S/R flip-flop means, the first lane latching means providing first lane latched output signals, each first lane latched output signal being provided in a first state as latched by a first-to-second state transition of its associated second stage output signal when said synchronized voted reset signal is in a first state and being cleared when said synchronized voted reset signal is in a second state, the first lane voting means receiving said first lane latched output signals and providing a first lane voted output signal in accordance with a majority of said first lane latched output signals, the first lane voted output signal being coupled to one of said S and R inputs of said S/R flip-flop means, the second lane latching means providing second lane latched output signals, each second lane latched output signal being provided in a first state as latched by second-to-first state transitions of its associated second stage output signal when said synchronized voted reset signal is in its second state and being cleared when said synchronized voted reset signal is in its first state, the second lane voting means receiving said second lane latched output signals and providing a second lane voted output signal in accordance with a majority of said second lane latched output signals, the second lane voted output signal being coupled to the other of said S and R inputs of said S/R flip-flop means.

* * * * *